United States Patent [19]
Yasuda

[11] Patent Number: 5,418,560
[45] Date of Patent: May 23, 1995

[54] VOICE AND IMAGE DATA COMMUNICATION APPARATUS

[75] Inventor: Hitoshi Yasuda, Yokohama, Japan

[73] Assignee: Canon Kabushiki Kaisha, Tokyo, Japan

[21] Appl. No.: 885,616

[22] Filed: May 19, 1992

[30] Foreign Application Priority Data

May 21, 1991 [JP] Japan .................. 3-145385
Jan. 7, 1992 [JP] Japan .................. 4-018476

[51] Int. Cl.⁶ .................. H04N 11/00; H04N 7/14
[52] U.S. Cl. .................. 348/14; 379/96
[58] Field of Search .......... 379/53, 54, 96, 98, 379/97; 358/85; H04N 7/14, 7/15; 348/14, 15, 16, 13

[56] References Cited

U.S. PATENT DOCUMENTS

| | | | |
|---|---|---|---|
| 4,856,045 | 8/1989 | Hoshina | 379/96 |
| 5,054,055 | 10/1991 | Hanle et al. | 379/96 |

FOREIGN PATENT DOCUMENTS

| | | | |
|---|---|---|---|
| 0436345 | 7/1991 | European Pat. Off. | 379/53 |
| 0158182 | 9/1984 | Japan | 379/53 |
| 0277079 | 11/1989 | Japan | H04N 7/14 |
| 0305788 | 12/1989 | Japan | H04N 7/14 |
| 0311744 | 12/1989 | Japan | 379/53 |
| 0067888 | 3/1990 | Japan | H04N 7/14 |
| 0192380 | 7/1990 | Japan | H04N 7/14 |
| 0194786 | 8/1990 | Japan | H04N 7/14 |
| 3234190 | 10/1991 | Japan | H04N 7/14 |

*Primary Examiner*—Curtis Kuntz
*Assistant Examiner*—Stella L. Woo

[57] ABSTRACT

Data communication apparatus capable of communicating voice and image data includes an input unit which inputs an image at the apparatus. A display unit displays an image sent from a partner communication apparatus and a call generating operation image plane. A call generation operation to the partner communication apparatus is detected and the input and display units are controlled so that the inputted image at the apparatus is part of a display of the call generation operation image plane when the call generation operation is detected.

9 Claims, 10 Drawing Sheets

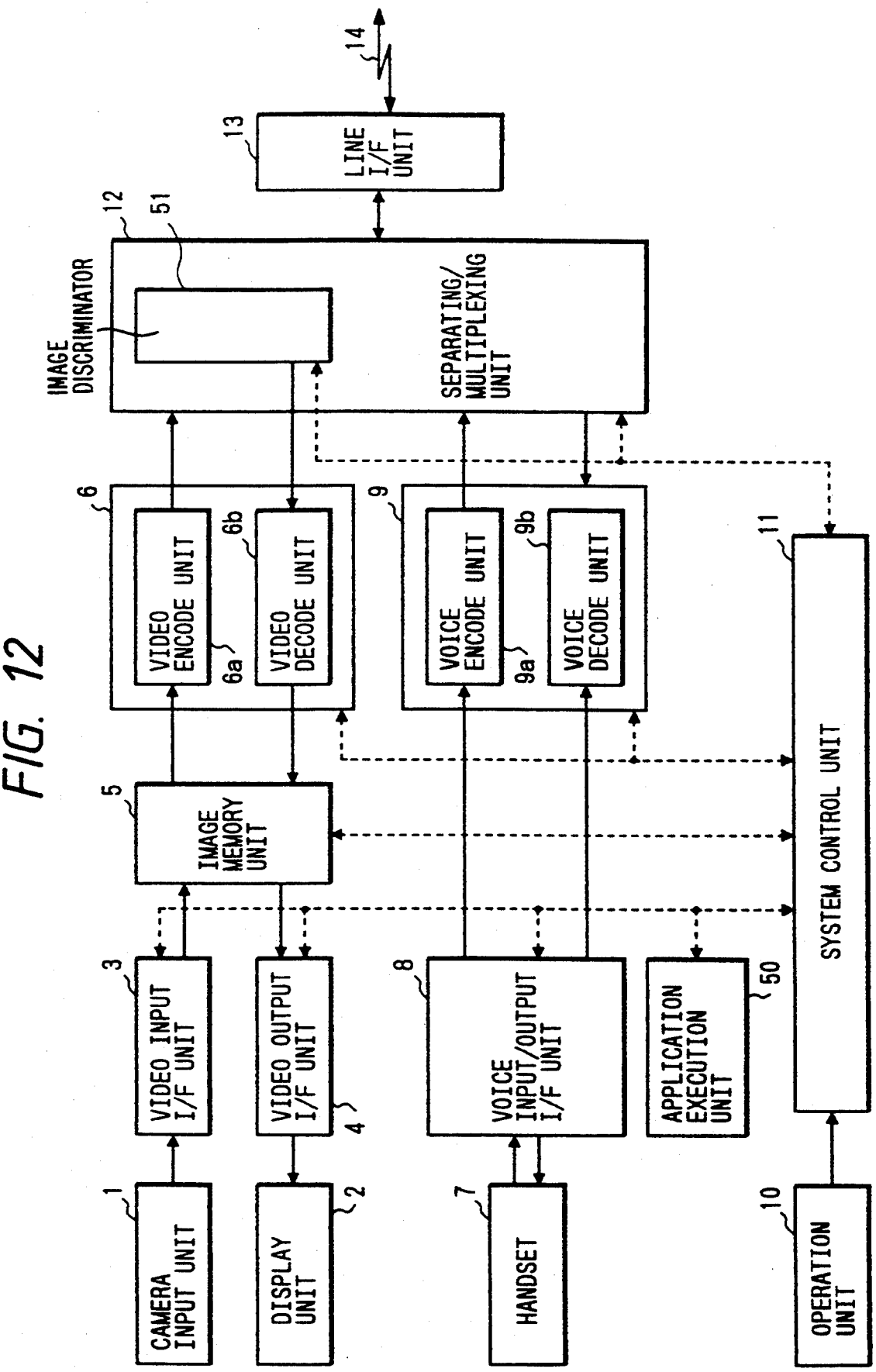

APPLICATION OPERATION·
CALL RECEPTION WAITING STATE

APPLICATION OPERATION·
CALL RECEPTION STATE

APPLICATION OPERATION·
SPEECH COMMUNICATION PARTNER
IMAGE PRESENT STATE

APPLICATION OPERATION·
SPEECH COMMUNICATION PARTNER
IMAGE ABSENT STATE

VOICE AND IMAGE DATA COMMUNICATION APPARATUS

BACKGROUND OF THE INVENTION

1. Field of the Invention

The invention relates to a data communication apparatus having a communication function of both of voice data and image data.

2. Related Background Art

Generally, in an image communication telephone having a communicating function of both of a voice and an image, the transmission side respectively encodes the voice signal and image signal, multiplexes the resultant codes and transmits to the partner side. The reception side separates the multiplexed codes, decodes each code and generates the voice and image. In the case of displaying the image, there is known what is called a picture in picture (PinP) function to not only display the image on the partner side but also display both of the image on the partner side and the own image by a multi-window.

Hitherto, such a kind of image communication telephone is constructed so as to switch an image plane in a mode to display only the image on the partner side and an image plane in the PinP mode by a switching operation. Therefore, by selecting the image plane in the PinP mode by the switching operation, the user can display the own image which is displayed in the image communication telephone on the partner side.

However, in the above conventional image communication telephone, since the image plane in the PinP mode is manually switched, for instance, in the case of checking the own image before the start of the communication, the switching operation must be performed each time, so that there is a problem such that the operation is troublesome.

On the other hand, according to the apparatus such that an image communication telephone having a data communicating function of a voice and an image is provided with an application function such as function of a word processor (typewriter), function of a computer, or the like, when a call reception occurs during the display of an image plane of the application function and a handset is off hooked, the image plane is automatically switched to the image on the partner side.

In the above conventional image communication telephone, however, in the case where the image plane of the application function is displayed by a display unit, when a call reception occurs and the handset is off hooked, the image plane is automatically switched to the image on the partner side. Therefore, the image plane is switched even in the case where the user doesn't erase the image plane of the application function or the partner side doesn't transmit the image, so that there is a problem such that it is troublesome for the user.

SUMMARY OF THE INVENTION

It is an object of the invention to eliminate the drawbacks of the conventional techniques mentioned above and it is an object of the invention to provide a data communication apparatus which can automatically confirm an own image to be transmitted before a communication with a partner apparatus is started.

It is another object of the invention to provide a data communication apparatus in which when a call generating operation is detected, an own image can be automatically displayed on an operation image plane for the call generating operation.

It is still another object of the invention to provide a data communication apparatus in which when a reception from a partner communication apparatus is detected, an own image can be automatically displayed on an image plane for selecting whether the apparatus should respond to the reception or not.

It is further another object of the invention to provide a data communication apparatus in which even when a reception occurs during the display of an image for an application function other than the display regarding a data communication, the image for the application function can be continuously displayed.

It is yet a further another object of the invention to provide a data communication apparatus in which an image sent from a partner apparatus can be displayed on an image for an application function.

The above and other objects and features of the present invention will become apparent from the following detailed description and the appended claims with reference to the accompanying drawings.

BRIEF DESCRIPTION OF THE DRAWINGS

FIG. 12 is a block diagram showing a construction of an embodiment of an image communication telephone in the second embodiment of the invention;

DETAILED DESCRIPTION OF THE PREFERRED EMBODIMENTS <First embodiment>

Figure 1:
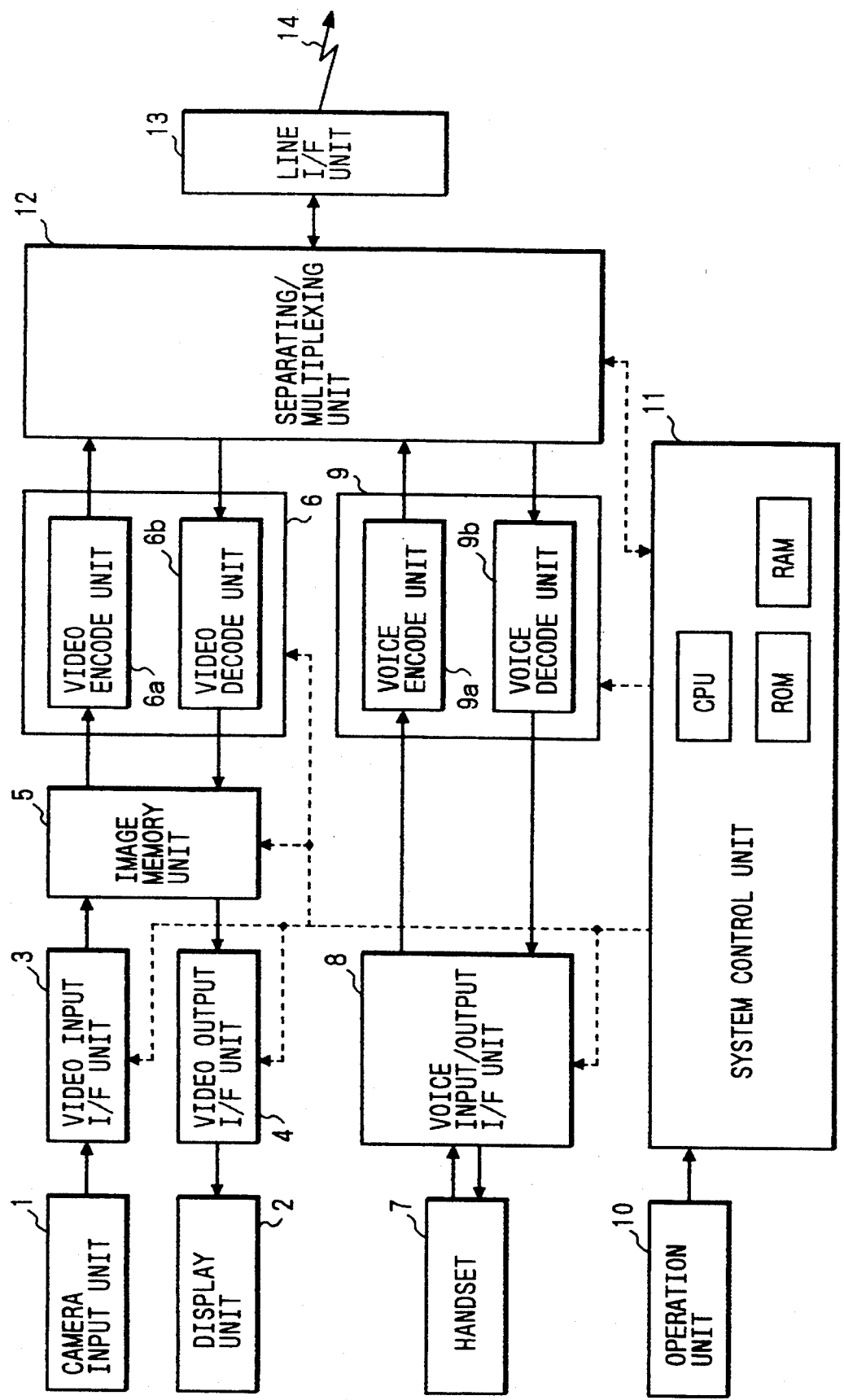
FIG. 1 is a block diagram showing an embodiment of an image communication telephone in the first embodiment of the invention.
Figure 2:
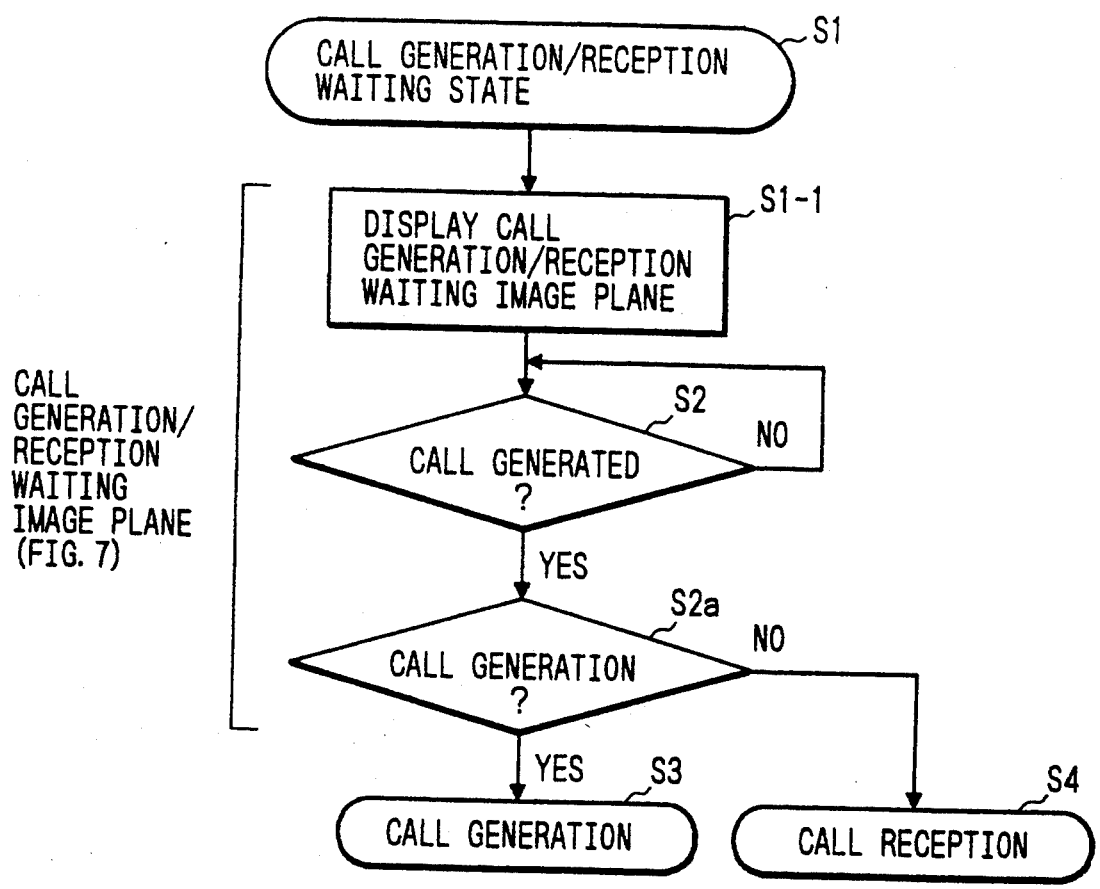
FIG. 2 is a flowchart for explaining the operation upon call generation of the image communication telephone of FIG. 1.
Figure 3:
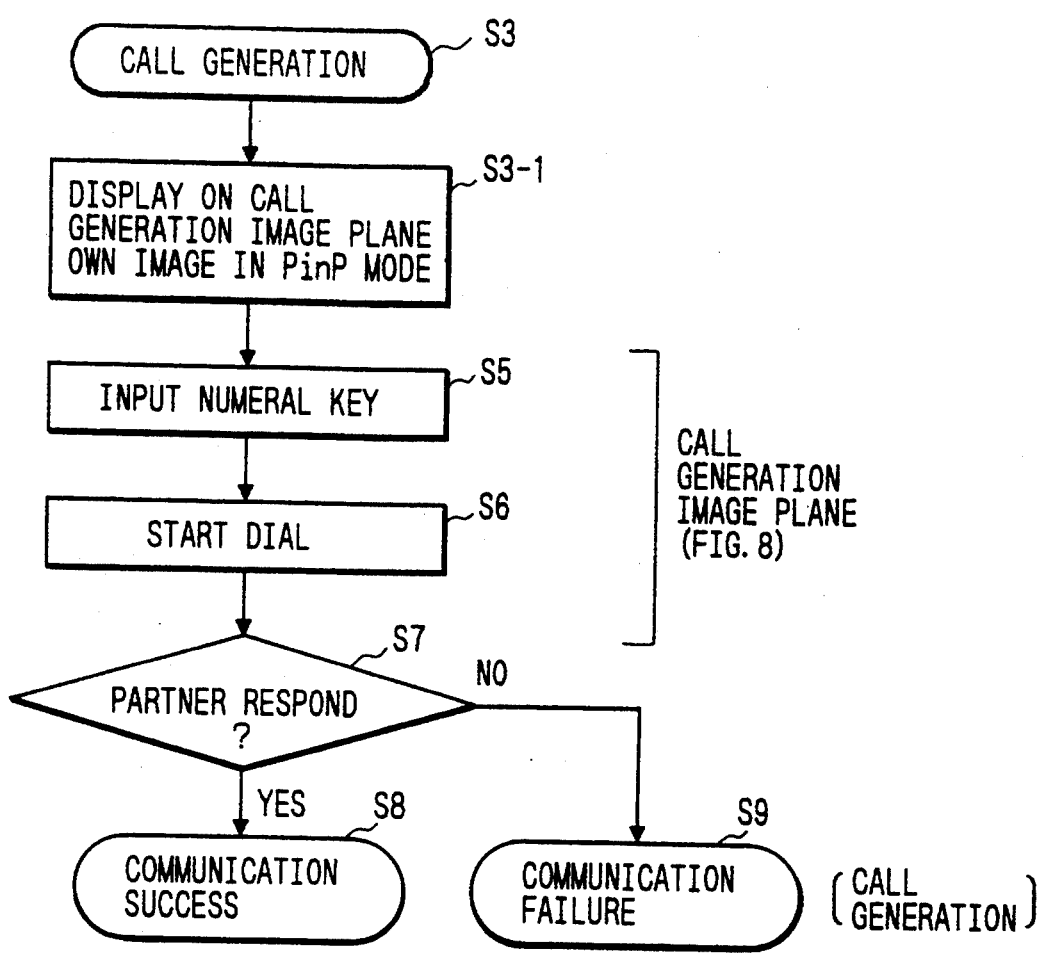
FIG. 3 is a flowchart for explaining the operation upon call generation of the image communication telephone of FIG. 1.

The first embodiment of the present invention will be described hereinbelow with reference to the drawings. FIG. 1 is a block diagram showing an embodiment of an image communication telephone according to the invention. FIG. 2 is a flowchart for explaining the operation of the image communication telephone of FIG. 1. FIG. 3 is an explanatory diagram showing a display unit and an operation unit of the image communication telephone of FIG. 1.

In the circuit at the upper stage shown in FIG. 1, a transmission image such as an own image, figure, or the like is photographed by a camera input unit 1. An image signal obtained is stored into an image memory unit 5 through a video input interface unit 3 and, thereafter, it is encoded by a video encode unit 6a of a video encode/decode unit 6. The code of the image is multiplexed by a separating/multiplexing unit 12 together with a code of a voice, which will be explained hereinlater. The multiplexed code is transmitted to the partner side through a line interface unit 13 and a communication line 14.

The multiplexed code of the image and voice from the partner side is received through the communication line 14 and line interface unit 13 and is separated by the separating/multiplexing unit 12. The image code is decoded by a video decode unit 6b of the video encode/decode unit 6. The image signal is stored into the image memory unit 5 and, thereafter, it is displayed on the screen of the display unit 2 via a video output interface unit 4.

In the case of displaying an image plane in the PinP mode to a display unit 2, the image signal picked up by the camera input unit 1 and the image signal transmitted from the partner side are processed in the image memory unit 5 under the control of a system control unit 11. The processed image signal is supplied to the display unit 2 through the video output interface unit 4. The video encode/decode unit 6 encodes the transmission image (by the video encode unit 6a) or decodes the reception image (by the video decode unit 6b) in accordance with, for instance, the draft of the CCITT Recommendation H. 261.

A handset 7 shown at the middle stage in FIG. 1 has a transmitter to transmit voice and a receiver to reproduce the voice of the partner side. The transmitter voice signal is encoded by a voice encode unit 9a of a voice encode/decode unit 9 through a voice input/output interface unit 8. The voice code is multiplexed by the separating/multiplexing unit 12 together with the image code mentioned above. The multiplexed code is transmitted to the partner side via the line interface unit 13 and the communication line 14.

The voice code from the partner side is received through the communication line 14 and the line I/F unit 13 and is separated from the image code by the separating/multiplexing unit 12 and is decoded by a voice decode unit 9b of the voice encode/decode unit 9. The voice signal is supplied to the receiver of the handset 7 through the voice input/output I/F unit 8.

The voice input/output I/F unit 8 erases an echo of the transmitter voice signal, generates various tones such as dial tone, calling tone, busy tone, reception tone, and the like, and supplies to the receiver of the handset 7, communication line 14, and the like under the control of the system control unit 11. On the other hand, under the control of the system control unit 11, the voice encode/decode unit 9 encodes the transmission voice signal (by the voice encode unit 9a) or decodes the reception voice signal (by the voice decode unit 9b) in accordance with a voice encode/decode algorithm of, for instance, 64 kbps PCM (pulse code modulation) A-law, 64 kbpc PCM $\mu$-law, 64 kbps/56 kbps/48 kbps SB-ADPCM (band division adaptive differential PCM), 32 kbps ADPCM, 16 kbps (for instance, APC-AB: bit assignment adaptive prediction encoding), 8 kbps, or the like.

In accordance with the CCITT Recommendation H.221, the separating/multiplexing unit 12 multiplexes the image code which has been encoded by the video encode unit 6a of the video encode/decode unit 6, the voice code which has been encoded by the voice encode unit 9a of the voice encode/decode unit 9, and the control signal from the system control unit 11 on a transmission frame unit basis. The reception frame is separated into the image code, voice code, and control signal and supplied to the video decode unit 6b of the video encode/decode unit 6, voice decode unit 9b of the voice encode/decode unit 9, and system control unit 11. The line interface unit 13 controls the communication line 14 in accordance with the ISDN (integrated service digital network) user/network interface.

An operation unit 10 shown at the lower stage in FIG. 1 is constructed by a keyboard, a touch panel, or the like to input various control information. In the embodiment, a touch panel is used as an operation unit 10 and a liquid crystal display (LCD) is used as a display unit 2. The system control unit 11 comprises a CPU (central processing unit), an ROM (read only memory), an RAM (random access memory), an auxiliary memory device, and the like and monitors the state of each of the above component elements and controls the whole apparatus and, particularly, executes an application program to form a display image plane of the display unit 2 or the like.

The operation of the embodiment will now be described with reference to FIGS. 2 to 10. First, a call generation or a call reception occurs in a call generation/reception waiting state shown in step S1 in FIG. 2 (step S2). In accordance with the call generation or call reception (step S2a), the system control unit 11 executes a call generation routine or a call reception routine as shown in detail in FIG. 3 or 4 (steps S3 and S4). In the call generation/reception waiting state, in step S1-1, as shown in FIG. 7, a master image plane 16a in the initial state having a call generation switch 15 is displayed by the display unit 2. The call generating operation is performed when an off hook signal of the handset 7 or an off hook signal of the call generation switch 15 of the operation unit 10 is detected. The call receiving operation is performed when a reception signal is received through the communication line 14 and line I/F unit 13.

Figure 5:
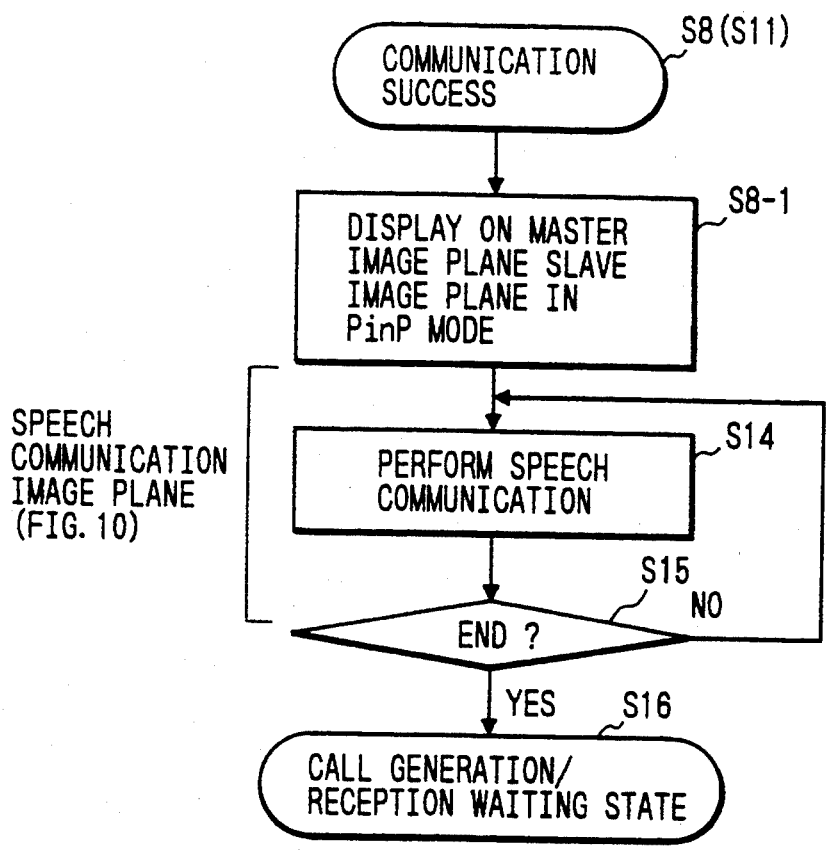
FIG. 5 is a flowchart for explaining the operation during the communication of the image communication telephone of FIG. 1.
Figure 8:
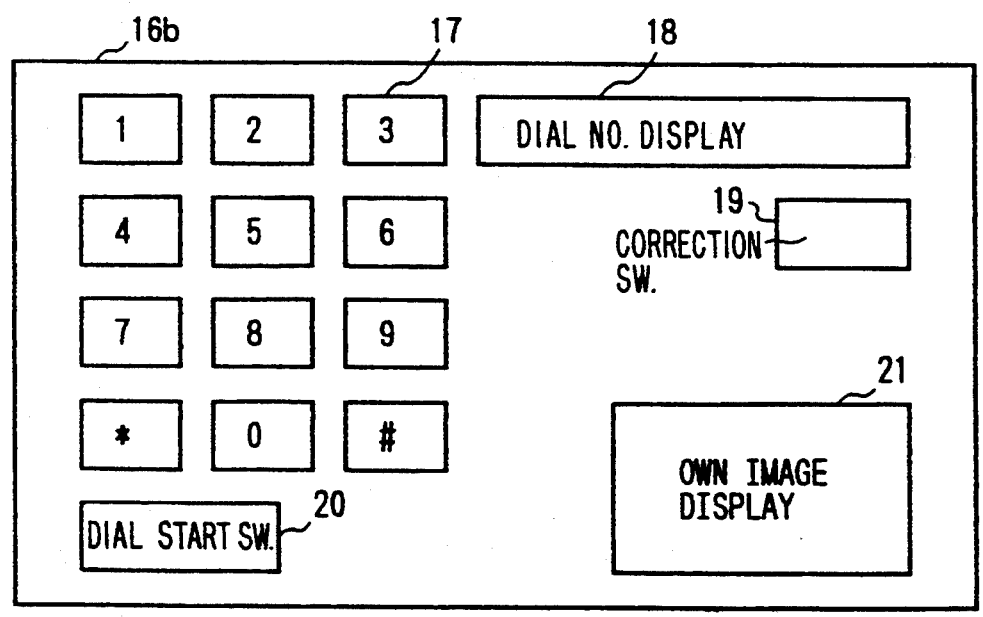
FIG. 8 is an explanatory diagram showing the display unit and an operation unit in the call generating operation of the image communication telephone of FIG. 1.

In the call generation routine shown in FIG. 3, the system control unit 11 controls the display unit 2 so as to display a master image plane 16b as shown in FIG. 8 in step S3-1. The master image plane 16b has: a numeral switch 17 to input a dial number; a display unit 18 of the dial number; a correction switch 19 of the dial number; a dial start switch 20; and a slave image plane 21 on which an own image is displayed. That is, when the call generation is selected, the own image is automatically displayed on the slave image plane 21 at this time point. In the call generation state, when the operator inputs numerals of the number of the partner side through the numeral switch 17 or the like (step S5) and depresses the dial start switch 20 (step S6), the voice input/output I/F unit 8 is controlled so as to transmit the dial to the communication line 14 via the line I/F unit 13. Subsequently, when the partner side responds, a communication success routine as shown in FIG. 5 is executed (steps S7 and S8). On the other hand, when the partner side doesn't respond, a communication failure (call generation) routine as shown in FIG. 6 is executed (steps S7 and S9).

Figure 4:
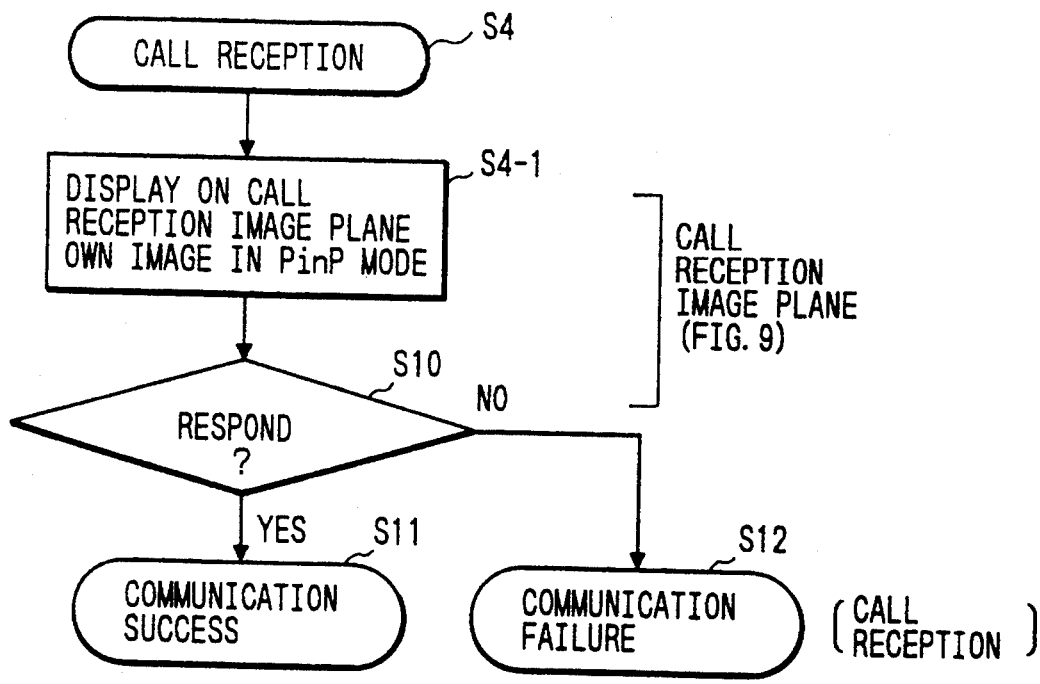
FIG. 4 is a flowchart for explaining the operation upon call reception of the image communication telephone of FIG. 1.
Figure 9:
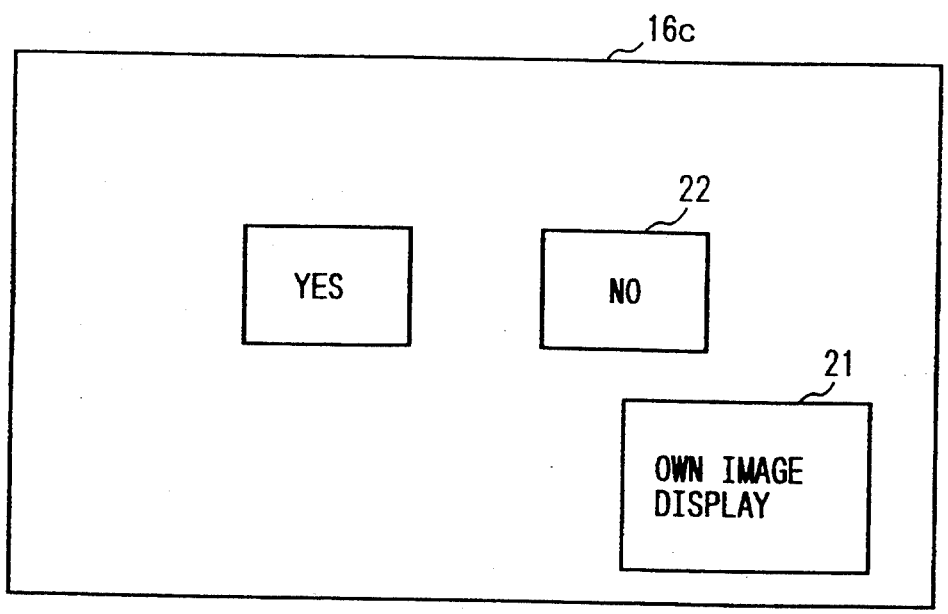
FIG. 9 is an explanatory diagram showing the display unit and operation unit call reception of the image communication telephone of FIG. 1.

In a call reception routine shown in FIG. 4, the system control unit 11 controls the display unit 2 so as to display a master image plane 16c as shown in FIG. 9 in step S4-1. The master image plane 16c displays the slave image plane 21 on which the own image is displayed and a state of response switch 22 ("YES", "NO" shown in the diagram). Namely, when there is a call reception, the own image can be automatically displayed before the reception is selected. When "YES" of the response switch 22 is operated, the communication success routine as shown in detail in FIG. 5 is executed (steps S10 and S11). When "NO" of the response switch 22 is operated, a communication failure (call reception) routine as shown in detail in FIG. 11 is executed (steps S10 and S12).

Figure 10:
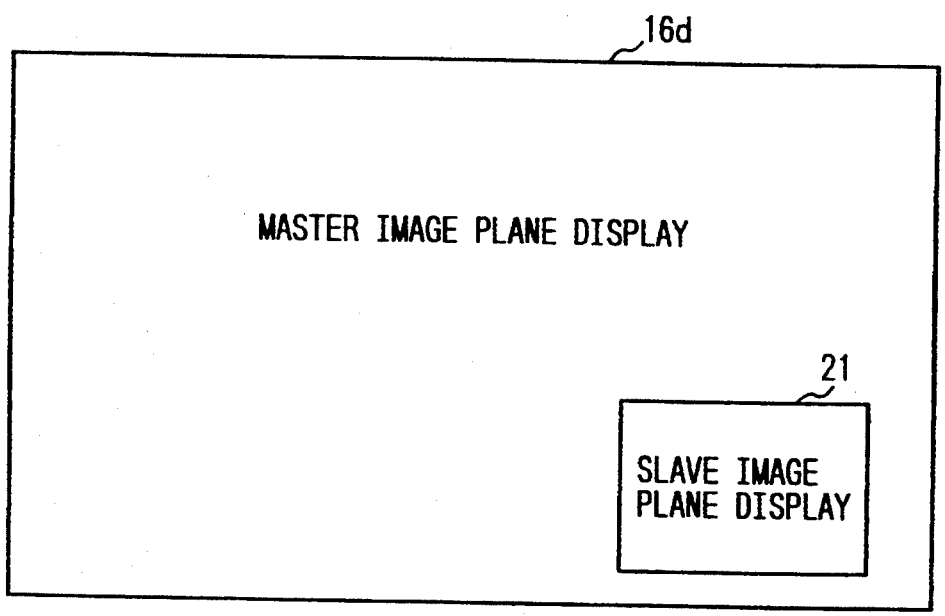
FIG. 10 is an explanatory diagram showing the display unit and operation unit during the communication of the image communication telephone of FIG. 1.

In the communication success routine shown in FIG. 5, in step S8-1, as shown in FIG. 10, the slave image plane 21 on which the own image is displayed and a master image plane 16d in the PinP (picture in picture) mode having an image on the partner side are displayed and a speech communication state (step S14) is set. After completion of the speech communication by an on hook signal of the handset 7 or the like (step S15), the control unit is returned to the call generation/reception waiting state shown in FIG. 2 (step S16).

Figure 6:
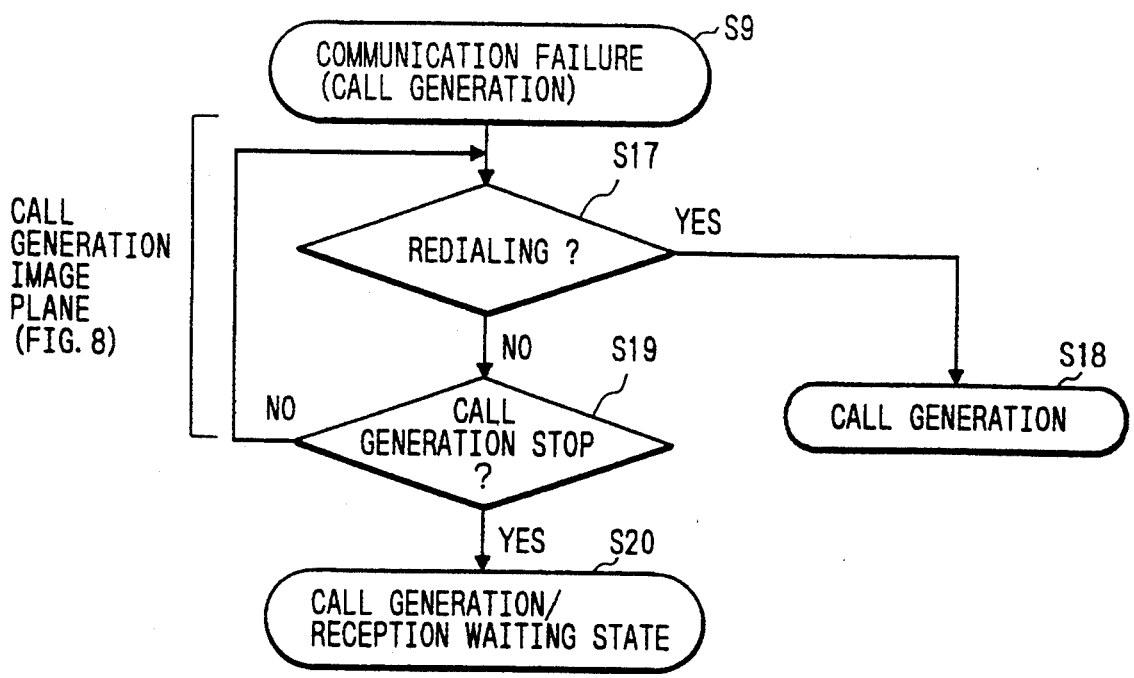
FIG. 6 is a flowchart for explaining the operation at the time of a failure of the call generation of the image communication telephone of FIG. 1.
Figure 7:
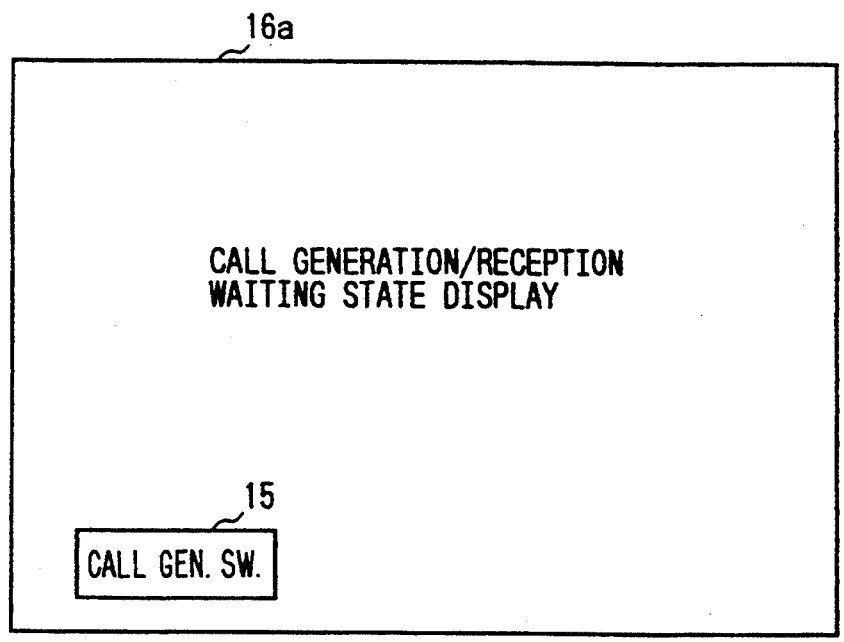
FIG. 7 is an explanatory diagram showing a display unit in a waiting state of the image communication telephone of FIG. 1.

In the communication failure (call generation) routine shown in FIG. 6, the master image plane 16b of the call generation state as shown in FIG. 8 is displayed. In this state, when the redial is performed through the numeral switch 17 or the like (step S17), the processing routine advances to the call generation routine shown in FIG. 3 (step S18). When the call generation is stopped (step S19), the control unit is returned to the call generation/reception waiting state shown in FIG. 2 (step S20).

Figure 11:
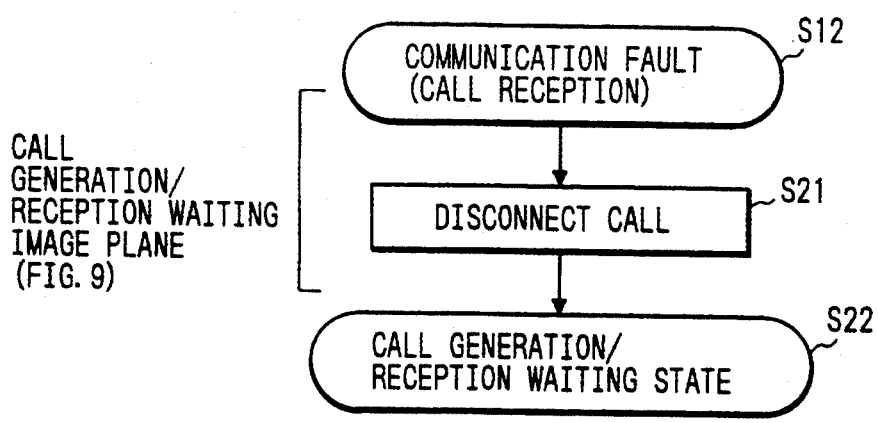
FIG. 11 is a flowchart for explaining the operation at the time of a failure of the call reception of the image communication telephone of FIG. 1.

In the communication failure (call reception) routine shown in FIG. 11, an image plane shown in FIG. 9 is displayed. When the call reception fails, the call is disconnected and the control unit progresses to the call generation/reception waiting state (steps S21 and S22).

According to the first embodiment, therefore, the slave image plane 21 of the own image is displayed in both of the call generation state before the communication success as shown in FIGS. 3 and 8 and the call reception state before the communication success as shown in FIGS. 4 and 9, so that the user can automatically check the own image before the start of the communication.

<Second embodiment>

The control of the display image plane in the case where a call reception occurs during the display of an image for an application function will now be described as a second embodiment.

Figure 13:
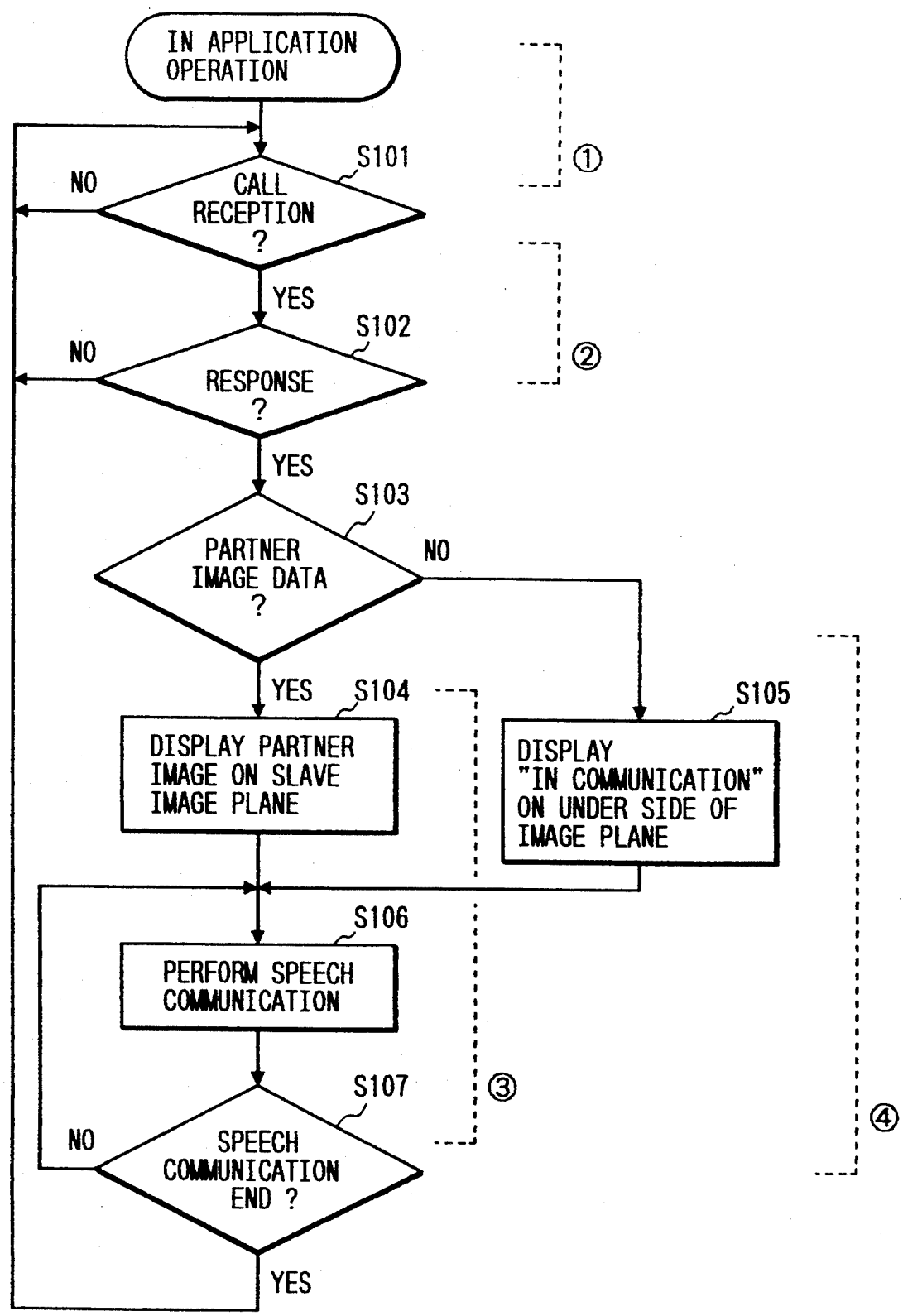
FIG. 13 is a flowchart showing the application operation of the image communication telephone of FIG. 12.

The second embodiment of the invention will now be described hereinbelow with reference to the drawings. FIG. 12 is a block diagram showing a construction of an embodiment of an image communication telephone according to the second embodiment. FIG. 13 is a flowchart for explaining the application operation of the image communication telephone of FIG. 12. FIG. 14 is an explanatory diagram showing a display image plane in the application operation of the image communication telephone of FIG. 12. In those diagrams, the same component elements as those shown in FIG. 1 are designated by the same reference numerals.

In FIG. 12, the camera input unit 1 shown at the upper stage is image input means and can input an own image, figure, or the like. The display unit 2 is image output means and is used to display an image supplied through the camera input unit 1, a reception image from the partner side, an operation image plane, an application image plane such as a word processor image plane, or the like. The video input interface 3 executes the switching of the camera input unit 1 or the like in accordance with an instruction from the system control unit 11. The video output interface unit 4 performs the switching of the display unit 2 or the like in accordance with an instruction from the system control unit 11. The image memory 5 is used to execute the picture in picture (PinP) process. The video encode/decode unit 6 has the video encode unit 6a and the video decode unit 6b. The video encode unit 6a and video decode unit 6b respectively execute the encoding process of the transmission image signal and the decoding process of the reception image signal in accordance with the draft of the CCITT Recommendation H.261.

The handset 7 shown at the middle stage in FIG. 12 is input/output means for voice and has a speaker and a microphone. The voice input/output interface unit 8 executes an echo cancelling process to erase an echo when the handset 7 is used, a process to generate tones such as dial tone, calling tone, busy tone, and reception tone, and the like in accordance with an instruction from the system control unit 11. The voice encode/decode unit 9 has the voice encode unit 9a and the voice decode unit 9b. The voice encode unit 9a and voice decode unit 9b respectively execute the encoding process of the transmission voice signal and the decoding process of the reception voice signal in response to an instruction from the system control unit 11 in accordance with the voice encode/decode algorithm such as 64 kbps PCM A-law, 64 kbps PCM μ-law, 64 kbps/56 kbps/48 kbps SB-ADPCM, 32 kbps ADPCM, 16 kbps (for instance, APC-AB), 8 kbps, or the like.

The operation unit 10 shown at the lower stage in FIG. 12 is control information input means for controlling the whole apparatus and is constructed by a keyboard, a touch panel, or the like. The system control unit 11 comprises a CPU (central processing unit), an ROM (read only memory), an RAM (random access memory), an auxiliary memory device, and the like. The system control unit 11 monitors the state of each of the above component elements 1 to 10 and executes the control of the whole apparatus, operation according to the state, formation of the display image plane, execution of the application program, and the like.

In accordance with the CCITT Recommendation H.221, the separating/multiplexing unit 12 multiplexes the image code from the video encode unit 6a, the voice code from the voice encode unit 9a, and the control signal from the system control unit 11 on a transmission frame unit basis. The unit 12 also separates the reception frame into each of the above codes and the control signal and supplies to the video decode unit 6b, voice decode unit 9b, and system control unit 11. The separating/multiplexing unit 12 has a partner image data presence/absence discrimination unit 51 to discriminate whether the image data of the partner side exists in the reception signal or not. The line I/F unit 13 controls the communication line 14 in accordance with the ISDN user/network interface. An application execution unit 50 executes an application function such as a word processor function other than the above image communication telephone function.

The operation of the image communication telephone function of the apparatus will now be described. In the case of transmission, the input image from the camera input unit 1 is supplied to the video encode unit 6a through the video input/output interface unit 3 and image memory 5 and is encoded. The input voice from the microphone of the handset 7 is supplied to the voice encode unit 9a through the voice input/output I/F unit 8 and is encoded. Each of the above codes and the control signal from the system control unit 11 are multiplexed by the separating/multiplexing unit 12 and the multiplexed signal is transmitted to the partner side via the line I/F unit 13 and communication line 14.

In the case of reception, the reception frame is received from the communication line 14 via the line I/F unit 13 and is separated into the image code and the voice code and the control signal of the system control unit 11 by the separating/multiplexing unit 12. The image code is decoded by the video decode unit 6b and supplied to the display unit 2 through the image memory 5 and video output I/F unit 4. The voice code is decoded by the voice decode unit 9b and is sent to the speaker of the handset 7 through the voice input/output I/F unit 8.

Figure 14A:
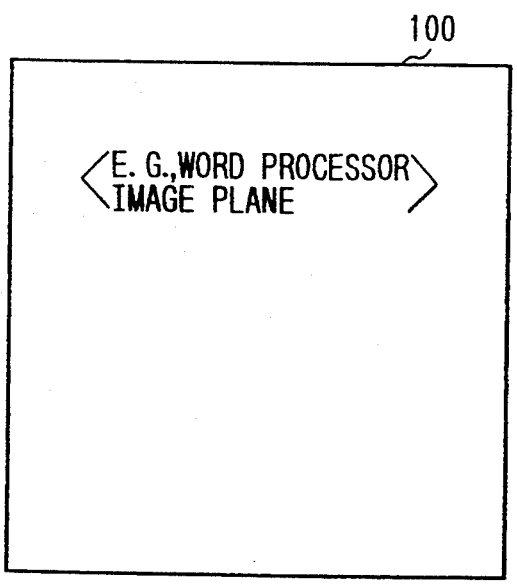
FIGS. 14A to 14D are explanatory diagrams showing display image planes in the application operation of the image communication telephone of FIG. 12.
Figure 14B:
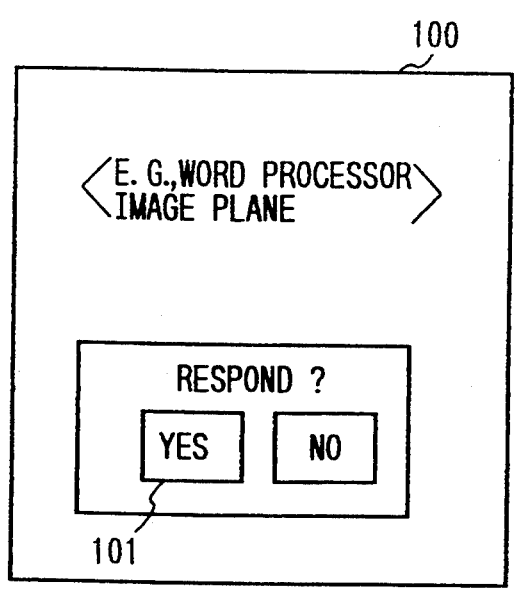

In the apparatus, as shown in FIGS. 13 and 14A to 14D, for example, the word processor function is executed by the application execution unit 50 and, as shown in FIG. 14A, an image plane (master image plane) 100 of such a function is displayed by the display unit 2. When a call reception occurs in the case where the image plane 100 of such a function is displayed by the display unit 2 (step S101 in FIG. 13), the system control unit 11 displays a switch image plane 101 to operate so as to instruct to respond to the call reception or not on the display unit 2 as a slave image plane as shown in FIG. 14B. When an instruction to respond is given through the operation unit 10, the processing routine advances from step S101 to step S102. When an instruction indicating that the respond is not performed is given, the processing routine is returned to step S101. In the example shown in FIGS. 14A to 14D, the LCD is used as a display unit 2. The touch panel which is overlaid onto the LCD is used as an operation unit 10.

Figure 14C:
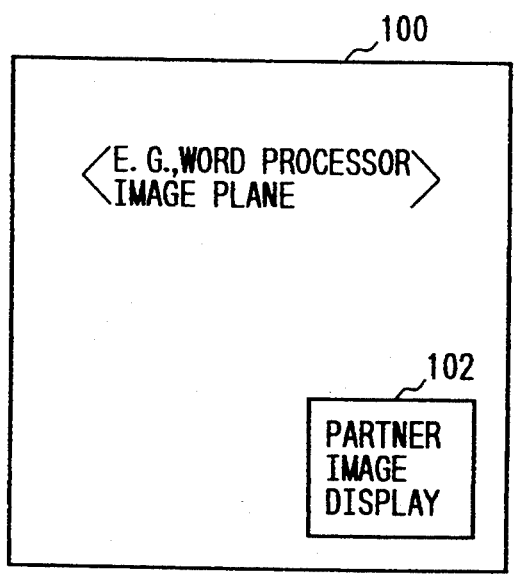
Figure 14D:
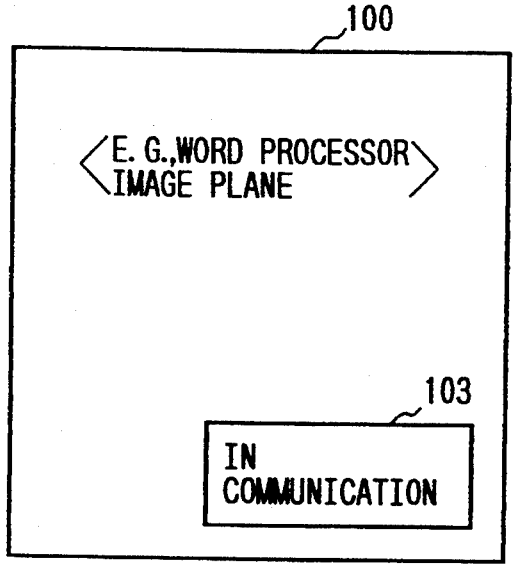

In step S103, when the partner image data presence/absence discrimination unit 51 of the separating/multiplexing unit 12 discriminates the image data of the partner side in the reception signal, as shown in FIG. 14C, an image 102 received from the partner side is PinP processed onto the word processor image plane 100, thereby displaying by a slave image plane (step S104). On the other hand, when the image data of the partner side doesn't exist in the reception signal, as shown in FIG. 14D, an image plane 103 indicating that the telephone is in speech communication is displayed by a slave image plane on the word processor image plane 100 (step S105). After completion of the speech communication state (step S106), the processing routine is returned from step S107 to step S101 and the control unit is set into the stand-by state.

Therefore, according to the second embodiment, the partner image data presence/absence discrimination unit 51 discriminates whether the image data of the partner side exists in the reception signal or not. When the image data of the partner side exists in the reception signal, the image 102 which has been received from the partner side is PinP processed onto the word processor image plane 100 and is displayed by the slave image plane, that the word processor image plane 100 can be continuously displayed and the troublesomeness in the case where a call reception occurs during the display of the image plane 100 of the application function can be prevented.

According to the first embodiment of the invention as described above, the data communication apparatus comprises: the image pickup means for picking up the own image; the display means for displaying the image of the partner side; the call detecting means for detecting at least one of the call generation and the call reception; the communication detecting means for detecting the communication state; and the control means for controlling the display means so as to display the own image photographed by the image pickup means for a period of time until the communication detecting means detects the start of the communication after the call detecting means detected the call generation or call reception and for controlling the display means so as to display both of the partner side image and the own image photographed by the image pickup means by switching the image plane for a period of time when the communication detecting means detects the communication state. Therefore, the own image is displayed for a period of time of the communication success from the call generation or call reception. Consequently, the user can automatically check the own image before the start of the communication.

According to the second embodiment of the invention, the data communication telephone having the image communication telephone function and the application function other than the image communication telephone function comprises: the display means for displaying the image from the partner side and the image for the application function; the detecting means for detecting whether the image from the partner side exists in the call reception signal or not; and the control means for allowing the image from the partner side to be displayed as a slave image plane onto the image for the application function when the detecting means detects the image from the partner side in the case where there is a call reception while the display means is displaying the image for the application function. Therefore, the image for the application function is continuously displayed. Consequently, the troublesomeness in the case where a call reception occurs during the display of the image plane of the application function can be prevented.

Although the present invention has been described with respect to the preferred embodiments, the invention is not limited to the foregoing embodiments but many modifications and variations are possible within the spirit and scope of the appended claims of the invention.

What is claimed is:

1. A data communication apparatus capable of communicating voice and image data, comprising:
   input means for inputting an own image;
   display means for displaying a partner image sent from a partner communication apparatus and a call generation operation image plane to be used when an operator of the data communication apparatus executes a call generating operation;

detecting means for detecting a call generating operation to the partner communication apparatus; and control means for causing said display means to automatically display the own image from said input means together with the call generating operation image plane when said detecting means detects the call generating operation, and for controlling said input means and said display means such that the own image from said input means is automatically and simultaneously displayed in a small area within the call generating operation image plane.

2. An apparatus according to claim 1, further comprising communication state detecting means for detecting a communication state between the own communication apparatus and the partner communication apparatus, and wherein said control means controls said input means and said display means so as to display the own image into said display means so as to display the own image into said call generating operation image plane until said communication state detecting means detects the start of the communication of data and also controls the input means and the display means so as to display the own image into the partner image sent from the partner communication apparatus after the detection of the start of the communication.

3. An apparatus according to claim 2, wherein said communication state detecting means discriminates the start of the communication on the basis of a response from the partner communication apparatus after the call was generated to the partner communication apparatus.

4. An apparatus according to claim 2, further having an image memory to synthesize the partner image sent from the partner communication apparatus and the own image from said input means, wherein said display means displays an image synthesized by said image memory.

5. An apparatus according to claim 1, wherein said input means is an image pickup camera to pick up an image.

6. A data communication apparatus capable of communicating voice and image data, comprising:

input means for inputting an own image;

display means for displaying a partner image sent from a partner communication apparatus;

detecting means for detecting whether there is an incoming call from the partner communication apparatus or not; and control means for causing, when said detecting means detects that there is the incoming call from the partner communication apparatus, said display means to automatically display the own image from said input means together with an image plane for selecting an instruction to respond to the incoming call or not, and for controlling said input means and said display means such that the own image from said input means is automatically and simultaneously displayed in a small area within the image plane for selecting the instruction to respond to the incoming call or not.

7. An apparatus according to claim 6, wherein after said display means displayed the image plane to select the instruction to respond to the incoming call or not, when an operator selects the instruction to respond to the, the incoming call said display control means allows the display means to display both of the partner image sent from the partner communication apparatus and the own image from the input means.

8. An apparatus according to claim 7, further having an image memory to synthesize the partner image sent from the partner communication apparatus and the own image from said input means, wherein said display means displays an image synthesized by said image memory.

9. An apparatus according to claim 6, wherein said input means is an image pickup camera to pick up an image.

* * * * *

UNITED STATES PATENT AND TRADEMARK OFFICE
CERTIFICATE OF CORRECTION

PATENT NO. : 5,418,560

DATED : May 23, 1995

INVENTOR(S) : HITOSHI YASUDA

It is certified that error appears in the above-identified patent and that said Letters Patent is hereby corrected as shown below:

ON TITLE PAGE

In [56] References Cited, under FOREIGN PATENT DOCUMENTS: "3234190  10/1991  Japan" should read --3-234190  10/1991  Japan--.

After FOREIGN PATENT DOCUMENTS, insert:
 --Attorney, Agent, or Firm—Fitzpatrick, Cella, Harper & Scinto--.

COLUMN 1

Line 25, "only-the" should read --only the--.

COLUMN 3

Line 2, "EMBODIMENTS <First" should read --EMBODIMENTS ¶ <First--.

COLUMN 7

Line 48, "respond" should read --response--.

UNITED STATES PATENT AND TRADEMARK OFFICE
CERTIFICATE OF CORRECTION

PATENT NO. : 5,418,560

DATED : May 23, 1995

INVENTOR(S) : HITOSHI YASUDA

It is certified that error appears in the above-identified patent and that said Letters Patent is hereby corrected as shown below:

COLUMN 10

Line 28, "the, the incoming call" should read --the incoming call--.

Signed and Sealed this

Twenty-first Day of November, 1995

Attest:

BRUCE LEHMAN

Attesting Officer

Commissioner of Patents and Trademarks